UNITED STATES PATENT OFFICE.

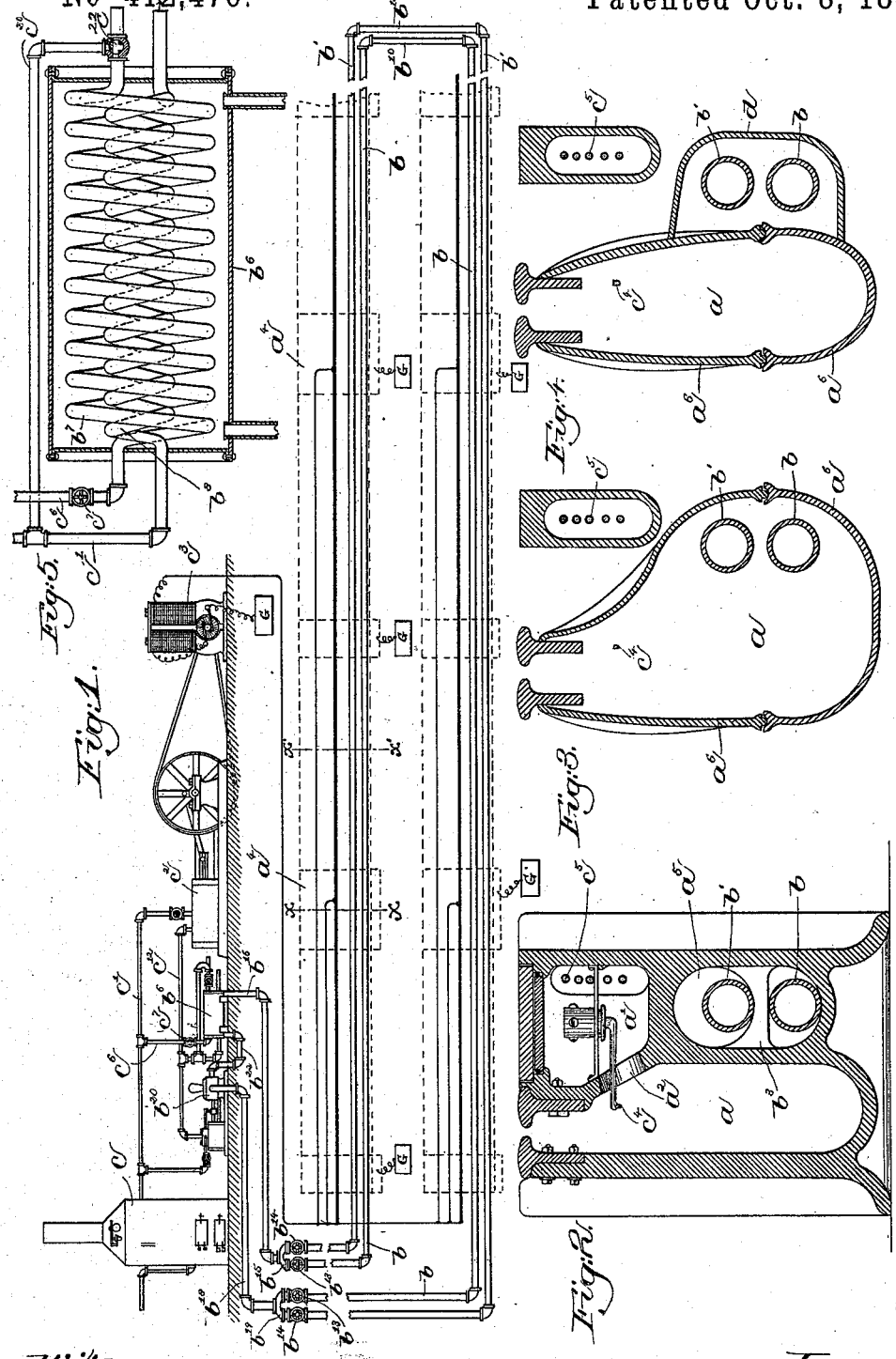

JOHN P. CUSHING, OF BEVERLY, MASSACHUSETTS.

ELECTRIC CONDUIT.

SPECIFICATION forming part of Letters Patent No. 412,476, dated October 8, 1889.

Application filed July 8, 1889. Serial No. 316,785. (No model.)

*To all whom it may concern:*

Be it known that I, JOHN P. CUSHING, of Beverly, county of Essex, State of Massachusetts, have invented an Improvement in Electric Conduits, of which the following description, in connection with the accompanying drawings, is a specification, like letters on the drawings representing like parts.

This invention relates to electric-railway conduits, and has for its object to provide means, as will be described, whereby the conduit may be maintained substantially dry in moist weather, and whereby ice is prevented from being formed and remaining lodged within the conduit in cold weather.

In accordance with my invention the conduit, composed, preferably, of a slot-chamber and an accessible chamber communicating therewith at suitable intervals, is dried by maintaining a circulation of heated water through pipes located, preferably, in a chamber of the conduit adjacent to the slot-chamber.

My invention therefore consists in the combination, with an electric conduit, of a main and return circulating-pipe extended the length of the conduit to convey a heating medium to heat the said conduit, a heater connected to said pipes, and a pump to maintain a circulation through the said heater and circulating-pipes, whereby the electric conduit is heated, substantially as will be described.

Figure 1 is a diagram representing in plan view two conduits laid side by side and each provided with circulating-pipes, and in elevation an apparatus for maintaining a circulation of heated water through the said pipes; Fig. 2, a transverse section of the conduit, which section may be supposed to be taken on line $x$ $x$, Fig. 1; Fig. 3, a transverse section of the conduit on line $x'$ $x'$, Fig. 1; Fig. 4, a transverse section of a modified form of conduit, and Fig. 5 a longitudinal section of one form of heater.

The conduit, consisting, preferably, of a slot-chamber $a$ and an accessible chamber $a'$, communicating therewith at suitable intervals by a passage $a^2$, may be substantially such as shown and described in United States Patent No. 392,664, dated November 3, 1888, wherein the conduit is shown as composed of sections, each of which is made in one casting.

I prefer to adapt my invention to a conduit composed, essentially, of castings or supporting-frames $a^4$, located at suitable intervals apart and each made to possess a slot-chamber $a$, an accessible chamber $a'$, connecting-passage $a^2$, and preferably an auxiliary chamber $a^5$, located below the accessible chamber and at the side of the slot-chamber. The slot-chamber $a$ and the auxiliary chamber $a^5$ of adjacent frames or castings $a^4$ are preferably connected by metal sheets $a^6$, as clearly shown in Fig. 3.

In accordance with my invention the slot-chamber $a$ and the accessible chamber $a'$ are maintained substantially dry by means of heat emanating from two pipes $b$ $b'$, located in an auxiliary chamber $a^5$, the pipe $b$ being shown as supported above the pipe $b'$ by a web $b^3$ of the frame $a^4$.

When a double track is laid in the street or roadway, as represented in Fig. 1, the pipes $b$ $b'$ in one conduit are connected at the terminal of the road remote from the power-station by cross-pipes or return-bends $b^{10}$ $b^{12}$, and the pipes $b$ $b'$ at their opposite ends, near the power-station, are provided with cocks or valves $b^{13}$ $b^{14}$, the said pipes at one end being joined by a coupling $b^{15}$ to a pipe $b^{16}$, and at their other end by a coupling $b^{17}$ to a pipe $b^{18}$.

The pipe $b^{16}$ is connected to and forms the inlet-pipe of a heater. (Shown as an inclosing case or shell $b^6$, containing two coils $b^7$ $b^8$, one within the other, to obtain a maximum radiating-surface.) The pipe $b^{18}$ is connected to and forms the outlet or discharge pipe of a pump $b^{20}$, which may be of any usual or well-known construction, the inlet-orifice of the pump being connected by pipe $b^{22}$ to the outlet-orifice of the heater. The pump $b^{20}$ is connected in usual or well-known manner to a steam-boiler $c$, connected by pipe $c'$ to the engine $c^2$, employed for driving the dynamo $c^3$, by which current is supplied to the main conductor $c^4$, located in the slot-chamber, and also to the auxiliary conductors or feed-wires $c^5$, located in the accessible chamber, substantially as in the patent referred to. The live-steam pipe $c'$ is provided, as shown, with a branch pipe $c^6$, and provided with a cock or valve $c^7$, connected to one end of the heating-coil $b^7$, the other end of the said coil being connected, as shown, by a branch pipe $c^{20}$ to a pipe $c^{21}$, joined to one end of the smaller coil $b^8$, and also to the steam-outlet pipe $c^{12}$ of the pump. The coil $b^7$ is provided, as shown, with a three-way cock or valve $c^{22}$, (see Fig. 5,) by which communication between the coil $b^7$ and pipe $c^{20}$ may be cut off, and the said coil connected to discharge into the atmosphere. The exhaust-steam from the engine $c^2$ and also from the pump $b^{10}$ is conducted by the pipe $c^{12}$ and branch pipe $c^{13}$ into the heating-coil $b^8$.

The heater $b^6$, the pump employed to circulate water through it and through the circulating-pipe $b\ b'$, the engine and its boiler, and the dynamo may all be supposed to be located at one and the same station—as, for instance, the power-station.

In operation the heater and the circulating-pipes connected therewith are filled with water or other fluid, and the same is heated in the heater $b^6$ to a moderate degree by the exhaust-steam passing through the coil $b^8$. The liquid heated in the heater $b^6$ is drawn therefrom by the pump through the pipes $b^{22}$ and $b^{18}$, and forced through one or both of the circulating-pipes, it traveling the length of the conduit through one pipe, as $b$, and returning back through the pipe $b$ in the other conduit, the valves $b^{13}$ being open; or both pipes may be used, if desired, by opening the valves $b^{13}\ b^{14}$. The fluid after circulating through the pipes returns to the heater substantially cold, when it is again heated. In this manner the auxiliary chamber $a^5$ of the conduit is warmed, and the heat transmitted from said chamber into the slot-chamber and accessible chamber is sufficient to keep the conductor and the insulators substantially dry in moist or damp weather; but in extreme cold weather—as, for instance, in the winter time—the liquid in the heater $b^6$ may be heated to a substantially high temperature by live steam, which may be admitted into the coil $b^7$ by opening the valve $c^7$ in the branch pipe $c^6$. In this way sufficient heat will be obtained in the conduit to melt any snow or ice which may form in the slot-chamber, and at the same time prevent the formation of frost in the ground around the conduit, thus obviating buckling and breaking of the frames or castings.

If desired, only one set, as $b'$, of the circulating-pipes may be used, the other pipes, as $b$, being kept in reserve in case of accident.

Instead of water, as herein specified, I may use any other fluid—such, for instance, as glycerine or other oil, as petroleum-oil.

I prefer to locate the circulating-pipes $b\ b'$ in the auxiliary chamber $a^5$ of the castings $a^4$, and to envelop the said pipes between adjacent castings by the metal sheets $a^6$, as shown in Fig. 3; but I do not desire to limit my invention in this respect, as the said circulating-pipes may be located outside of the slot-chamber $a$ and enveloped by a separate metal sheet $d$, as shown in Fig. 4, and so also they may be located adjacent to the conduit in such close proximity thereto as to thoroughly heat the same.

In case only one conduit is extended through the street or roadway, the circulating-pipes $b\ b'$ (shown in Fig. 2) may be connected at their remote end for a continuous circulation.

I claim—

1. The combination, with an electric conduit, of a main and return circulating-pipe extended the length of the conduit to convey a heating medium to heat the said conduit, a heater connected to said pipes, and a pump to maintain a circulation through the said heater and circulating-pipes, whereby the electric conduit is heated, substantially as described.

2. The combination, with an electric conduit having a slot-chamber, a communicating accessible chamber, and an auxiliary chamber, of circulating-pipes located in said auxiliary chamber, a heater connected to said pipes, and a pump to maintain a circulation through said heater and pipes, substantially as described.

3. The combination, with an electric conduit having a slot-chamber, a communicating accessible chamber, and an auxiliary chamber, of circulating-pipes located in said auxiliary chamber, a heater consisting of an inclosing-case $b^6$, connected to said circulating-pipes, and heating-coils $b^7\ b^8$, located within said case, and a pump to maintain a circulation through said heater and pipes, substantially as described.

4. The combination, with two electric conduits laid side by side, of circulating-pipes for each conduit connected at the terminal of the conduit, a heater connected to said pipes, and a pump to maintain circulation of fluid through said pipes, substantially as described.

In testimony whereof I have signed my name to this specification in the presence of two subscribing witnesses.

JOHN P. CUSHING.

Witnesses:
   JAS. H. CHURCHILL,
   HOWARD F. EATON.